(12) United States Patent
Stierle et al.

(10) Patent No.: US 7,224,444 B2
(45) Date of Patent: May 29, 2007

(54) METHOD AND DEVICE FOR OPTICALLY MEASURING DISTANCE

(75) Inventors: Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 10/507,288

(22) PCT Filed: May 12, 2003

(86) PCT No.: PCT/DE03/01523

§ 371 (c)(1),
(2), (4) Date: Sep. 10, 2004

(87) PCT Pub. No.: WO2004/018968

PCT Pub. Date: Mar. 4, 2004

(65) Prior Publication Data

US 2005/0162639 A1    Jul. 28, 2005

(30) Foreign Application Priority Data

Aug. 3, 2002   (DE) ............................... 102 35 562

(51) Int. Cl.
*G01C 8/08*    (2006.01)
(52) U.S. Cl. .................. 356/5.15; 356/5.1; 356/5.13; 356/5.14
(58) Field of Classification Search ............... 356/5.15
See application file for complete search history.

(56) References Cited

U.S. PATENT DOCUMENTS 4,957,365 A    9/1990  Brinkmeyer
5,285,464 A  * 2/1994  Ogino .................... 372/38.07
5,347,236 A  * 9/1994  Neuharth et al. .............. 331/87
5,455,670 A   10/1995  Payne et al.
5,745,437 A    4/1998  Wachter et al.
6,364,393 B1  10/2002  Giger

FOREIGN PATENT DOCUMENTS

| DE | 37 43 678    | 7/1989  |
| DE | 43 03 804 A1 | 8/1994  |
| EP | 0 932 835 B1 | 8/2000  |
| GB | 2 336 493 A  | 10/1999 |
| WO | WO/0216964   | * 2/2002 |

* cited by examiner

*Primary Examiner*—Thomas H. Tarcza
*Assistant Examiner*—Luke D. Ratcliffe
(74) *Attorney, Agent, or Firm*—Michael J. Striker

(57) ABSTRACT

The invention relates to a method for optical distance measurement, in which a transmitter of a transmission branch (14), which branch is integrated with a measuring device (10), transmits a modulated measurement beam (16, 36) in the direction of a target object (20), and the measurement beam (17, 44) reflected or scattered by the target object (20) is detected by a measurement receiver (54) integrated with the measuring device (10) and is transformed by a frequency mixing process into a low-frequency range.

According to the invention, for detection and frequency transformation of the returning measurement signal (17, 44), a measuring diode (62) whose cathode voltage and anode voltage are modulated with high frequency to generate a mixing signal is used.

An apparatus (10) is also proposed for performing the method of the invention.

8 Claims, 2 Drawing Sheets

METHOD AND DEVICE FOR OPTICALLY MEASURING DISTANCE

CROSS-REFERENCE

The invention described and claimed hereinbelow is also described in PCT/DE 03/01523, filed on May 12, 2003 and DE 102 35 562.2, filed Aug. 3, 2002. This German Patent Application, whose subject matter is incorporated here by reference, provides the basis for a claim of priority of invention under 35 U.S.C. 119 (a)-(d).

The present invention is based on a method for optical distance measurement and on an apparatus for performing such a method.

BACKGROUND OF THE INVENTION

Distance measuring devices and in particular optoelectronic distance measuring devices have long been known per se. These devices transmit a modulated measurement beam, for instance a beam of light or a laser beam, which is aimed at a desired target object whose distance from the device is to be ascertained. The returning measurement signal reflected or scattered by the target object aimed at is detected again at least in part by a sensor in the device and used to ascertain the distance sought.

In the known devices of this type, a distinction is made between so-called phase measurement methods and pure transit time measurement methods for determining a sought distance from the target object. In the transit time measurement method, a pulse of light of the briefest possible pulse duration is transmitted by the measuring device, and then its transit time to the target object and back into the measuring device is ascertained. With the known value of the speed of light, the distance of the measuring device from the target object can be calculated from the transit time.

In the phase measurement method, conversely, the variation in the phase of the measurement signal is utilized as a function of the distance travelled to determine the distance between the measuring device and the target object. From the magnitude of the phase displacement impressed on the returning measurement signal, compared to the phase of the transmitted measurement signal, the distance travelled by the measurement signal can be determined, and thus the distance between the measuring device and the target object can also be determined.

The range of application of the distance measuring devices generally covers distances in the range from a few centimeters to several hundred meters. Meanwhile, such measuring devices are commercially sold in compact versions and make it simple for the commercial or private user to operate them, even in handheld form.

To attain high measurement precision with these devices, it is known to select and use as high as possible a modulation frequency. However, since nonambiguity of the phase measurement exists only for a phase angle between 0 and 360°, it is usual and also known for instance from German Patent Disclosure DE 43 03 804 A1 to alternate a high modulation frequency of the transmitted light beam with at least one further, substantially lower modulation frequency of the transmitted light beam, in order to attain a measurement range that goes beyond the phase angle range of 0 to 360° for the high modulation frequency.

It is also known, for more-precise ascertainment of a phase difference between the transmitted and the received measurement signal, to transform the signal to be analyzed to a markedly lower frequency, for instance by a frequency mixing process. This mixing process yields a low-frequency measurement signal which continues to be a carrier of the fundamental information, namely the phase displacement between the transmitted and the received signal, but because of its markedly reduced frequency is also substantially simpler to process further and can be evaluated more precisely.

To attain "downward mixing" of the measurement frequency, it is known to mix the transmission and reception signals with a signal whose frequency is displaced only far enough from the measurement frequency that an outcome of mixing is in the low-frequency range. In this low-frequency range, it is then no problem to measure the desired phase by means of a suitable switching device. Advantageously, the diode that detects the returning measurement signal can be used for this frequency mixing process.

From German Patent Disclosure DE 37 43 678 A1, an optical backscattering measuring device is known which has an optical transmitter whose transmission power can be modulated via an oscillator with a varying frequency. The transmission beam of the backscattering measuring device of DE 37 43 678 A1 is carried via a beam splitter into the optical waveguide to be examined. The portions of the transmitted beam that are backscattered by the optical waveguide are carried via the beam splitter to an optical receiver, embodied as a photodiode, of the optical backscattering measuring device. For ascertaining the location and intensity of the backscattering, in the backscattering measuring device of DE 37 43 678 A1, a mixed signal is formed from a signal that is proportional to the optical backscattering power and a modulation voltage that has the oscillator frequency. The expense for the optical receiver is reduced by providing that the photodiode is an avalanche photodiode, whose bias voltage is a direct voltage modulated by the modulation voltage. The low-frequency mixed signal thus generated is picked up at a parallel circuit, connected into the exciter circuit of the photodiode, that comprises an active resistor and a capacitor.

From European Patent Disclosure EP 0 932 835 B1, an apparatus for calibrating distance measuring instruments is known that has a transmitter which emits a high-frequency-modulated optical radiation and with it illuminates a measurement object. The apparatus of EP 0 932 835 B1 furthermore comprises a measurement receiver, which detects the radiation reflected by the measurement object and converts it into an electrical signal. From the transmitter beam path of the distance measuring instrument of EP 0 932 835 B1, some of the high-frequency-modulated transmitter radiation is permanently out-coupled and delivered, via an internal reference path serving as a calibration path, directly to a reference receiver, such as a PIN diode. This diode is connected to a frequency mixer. The frequency mixer is in turn connected directly to an avalanche photodiode, used as a measurement receiver for the measurement beam. A high-frequency electrical signal is coupled as a mixer frequency into this connection. This mixer frequency is mixed, via the frequency mixer, with the high-frequency modulation signal of the reference beam received from the reference receiver, and the result is a low-frequency calibration signal. On the other hand, the mixer frequency is mixed with the high-frequency modulation signal of the measurement beam received by the avalanche photodiode, and a result is a low-frequency measurement signal. Thus in the apparatus of EP 0 932 835 B1, the avalanche photodiode is a so-called direct mixer. The low-frequency calibration signal and the likewise low-frequency measurement signal are then delivered in a known manner to where the phase measurement is done.

SUMMARY OF THE INVENTION

The apparatus of the invention for optical distance measurement has a transmission branch, with at least one transmitter for transmitting modulated measurement beam in the direction of a target object. Advantageously, this transmitter is embodied as a laser diode, so that by modulation of the energy supply delivered to the laser diode, the desired high-frequency modulation can be impressed directly on the optical signal. The apparatus of the invention moreover has a reception branch, and the measuring receiver of the reception branch is embodied as a direct-mixing avalanche photodiode. This photodiode converts the incident optical signal into a corresponding electrical signal of the same frequency.

As a result of the modulation of the gain of the photodiode, and in particular because of the nonlinearity of the gain that determines the photoelectric current of the diode, the electrical output signal of the photodiode also has a signal whose frequency is defined by the difference between the frequency of the modulation of the incident optical measurement signal and the modulation frequency of the gain of the photodiode. In this kind of direct mixture of the measurement signal, the DC blocking voltage applied to the cathode of the diode, typically in the range from 50 V to 500 V, has a frequency-modulated small-signal voltage superimposed on it. This modulating small-signal voltage is typically sinusoidal but can have other frequency courses instead. Because of this modulation, thus along with the blocking voltage, the gain factor of a diode is also modulated as a function of frequency.

Advantageously, in the apparatus of the invention for optical distance measurement, not only the cathode bias voltage $U_K$ of the avalanche diode ($U_K=U_0+U_K(t)$), a voltage $U_A=u_A(t)$ applied to the anode is modulated as well. In this way, common-mode interference, which occurs both in the cathode path and the anode path of the measurement receiver, can be reduced or avoided entirely. This common-mode interference is no longer mixed in to its full intensity, since for the mixing in the diode, only the differential signal between the cathode and the anode plays a major role. Thus it is possible for instance for adulterations of the measured value caused by corresponding common-mode interference to be reduced markedly.

By the provisions recited in the dependent claims, advantageous refinements of the apparatus defined by the independent claims and of the corresponding claimed method are possible.

Advantageously, the apparatus of the invention has a circuit arrangement with which the avalanche photodiode, serving as a measurement receiver, can be acted upon on the anode side by a time-dependent anode voltage $u_A(t)$, which is equivalent to the inverted signal of the modulated cathode voltage $u_K(t)$. In the apparatus of the invention, thus both the anode and the cathode sides of the avalanche photodiode are modulated by a voltage of the same amount but of inverted polarity. For the mixing of the frequency of the measurement signal with the modulation of the diode used as a frequency mixer, only the time-dependent differential signal $U_D(t)$ between the cathode and the anode of the diode plays a major role. For the differential signal $U_D(t)$, the equation is accordingly:

$$U_D(t)=u_A(t)-u_K(t)=u_A(t)-u_K(t)=2u_A(t).$$

Compared to pure cathode modulation, in the method of the invention only half the modulation amplitude is thus needed to generate a modulation signal of desired intensity. Particularly in the higher frequency ranges, this is advantageous, because the driver output for generating the modulation frequencies can be reduced accordingly. Moreover, the unavoidable reradiation of the system is reduced to one-quarter of the value that would result if only cathode modulation of the measurement receiver were done, since for electrically short antennas, the reradiation increases quadratically with the amplitude of the transmission power.

In an advantageous embodiment of the apparatus of the invention, a singular modulator furnishes not only the modulating cathode voltage $u_K(t)$ but also the anode voltage $u_A(t)$. In this embodiment, it is possible by simple means to generate the desired modulations at the avalanche photodiode.

The photodiode converts the incident optical signal into a corresponding electrical signal of the same frequency. As a result of the modulation of the gain of the photodiode, the electrical output signal of the diode also has a signal whose frequency is defined by the difference between the frequency of modulation of the incident optical signal and the modulation frequency for the gain of the photodiode. In the apparatus of the invention, not only the cathode bias voltage but also the anode bias voltage are modulated. In the process in the photodiode, the differential signal between the cathode and the anode voltages comes to play a major role.

Further advantages of the apparatus and method according to the invention will become apparent from the drawings and the associated description.

BRIEF DESCRIPTION OF THE DRAWINGS

In the drawing, one exemplary embodiment of the apparatus of the invention for optical distance measurement is shown and will be explained in further detail in the ensuing description. The drawing figures, their description, and the claims directed to the invention include numerous characteristics in combination. One skilled in the art will also considered these characteristics and the claims referring to them individually and put them together to make further useful combinations and claims.

Shown are:

FIG. 1 schematically shows an optical distance measuring device 10 with its most important components, for the sake of describing its fundamental structure. The device 10 for distance measurement has a housing 12, in which both a transmission branch 14 for generating an optical measurement signal 16 and a reception branch 18 for detecting the measurement signal 17 returning from a target object 20 are embodied.

BRIEF DESCRIPTION OF THE PREFERRED EMBODIMENTS

Figure 1:
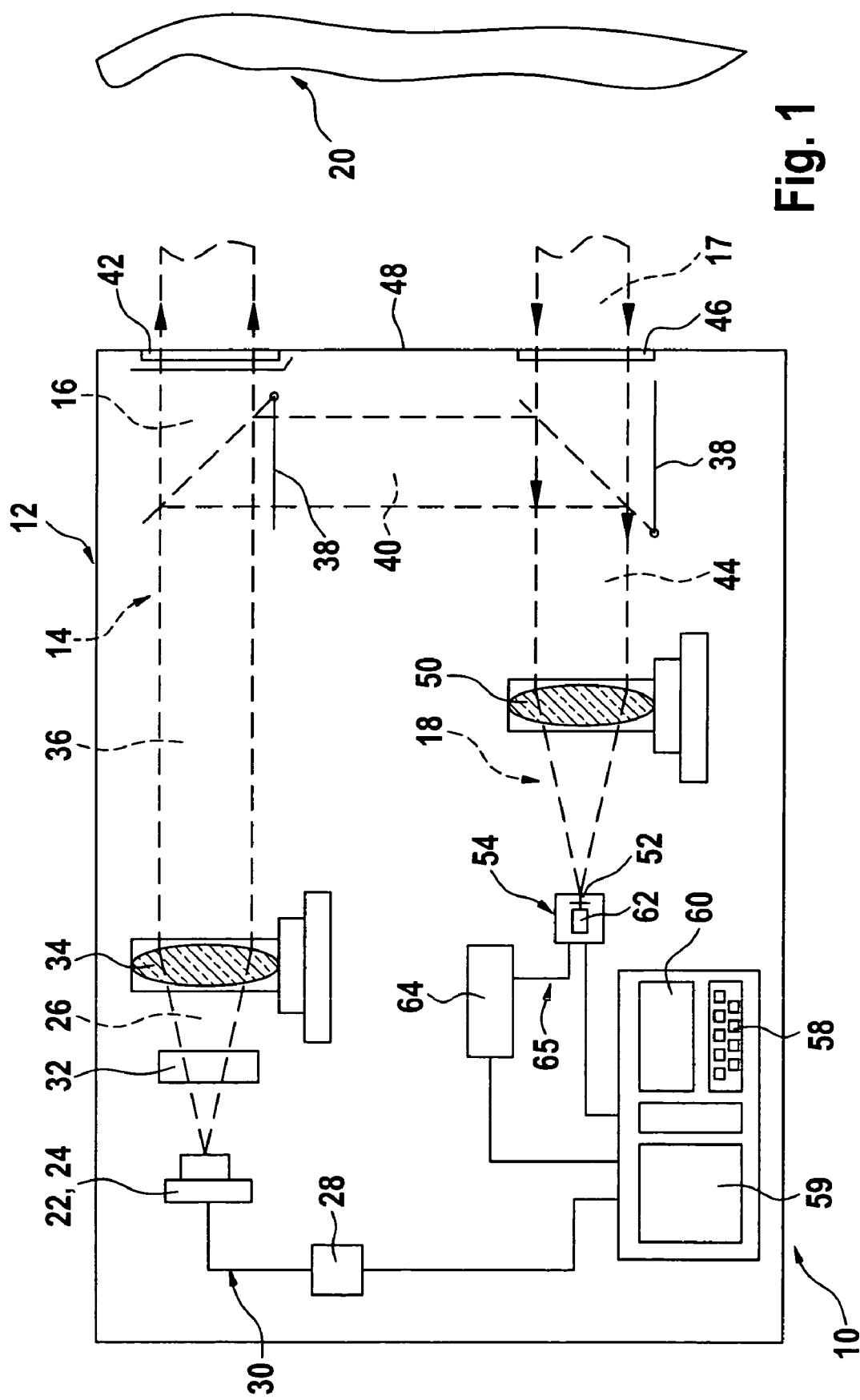
FIG. 1: An apparatus for optical distance measurement, in a simplified, schematic overall view.

Transmission branch 14, along with a number of components not otherwise shown, in particular has a light source 22, which in the exemplary embodiment of FIG. 1 is embodied by a semiconductor laser diode 24. It is equally possible to use other light sources in the transmission branch 14 of the apparatus of the invention. The laser diode 24 of the exemplary embodiment of FIG. 1 emits a laser beam in the form of a focused beam of light 26 that is visible to the human eye. To that end, the laser diode 24 is operated via a control unit 28, which by suitable electronics generates a modulation of the electrical input signal 30 to the diode 24. The control unit 28 in turn receives the required frequency signals for modulation of the laser diode from a control and evaluation unit 58 of the measuring device of the invention. In other exemplary embodiments, the control unit 28 may also be a direct, integral component of the control and evaluation unit 58.

The control and evaluation unit 58 includes a circuit arrangement 59, which among other elements has at least one quartz oscillator for furnishing the required frequency signals. With these signals, of which typically a plurality, at different frequencies, are used during a distance measurement, the optical measurement signal is modulated in a known manner. The fundamental structure of such an apparatus and the corresponding method for generating different measurement frequencies can be found for instance in German Patent DE 198 11 550 C2, so that at this point this reference is merely referred to, and the contents of this reference are expressly incorporated herein, but will not be addressed further within the context of the present description.

The intensity-modulated focused beam 26 of light emerging from the semiconductor diode 24 passes through a first optical element 32, which brings about an improvement in the beam profile of the measurement beam. Such an optical element is an integral component of a modern laser diode. The measurement beam 26 then passes through a collimator lens 34, which generates a virtually parallel beam 36 of light that is transmitted by the apparatus in the direction of a target object 20 to be measured.

Also found in the transmission branch 14 of the apparatus of the invention shown in FIG. 1 is a device 38 for generating a reference path 40 that is internal to the device and with which an internal calibration of the measuring device can be performed.

The measurement signal 16 is out-coupled from the housing 12 of the apparatus 10 through an optical window 42. For the actual measurement operation, the apparatus 10 is aimed at the desired target object 20 whose distance from the measuring device is to be ascertained. By actuation of an operator control element, not further shown, the optical window 42 can be opened, so that the measurement beam 36 strikes the target object 20. The signal 17, reflected or scattered by the desired target object 20, passes to a certain extent through an entry window 46 to return into the housing 12 of the apparatus 10 of the invention. The measurement beam 20 entering the face end 48 of the apparatus 10 through the entry window 46 forms a returning measurement beam 44, which is steered toward a receiving lens element 50. The receiving lens 50 focuses the returning measurement beam 44 at the active face 52 of a receiving device 54.

The receiving device 54 of the apparatus of the invention has a photodiode 62, which in a known manner converts the arriving light signal 17 into an electrical signal, which is then carried onward, via suitable connecting means 56, to a control and evaluation unit 58 of the apparatus 10. From the returning optical signal 17 and particularly from the phase displacement impressed on the returning signal, in comparison with the originally transmitted signal 16, the control and evaluation unit 58 ascertains the distance sought between the apparatus 10 and the target object 20. The ascertained distance can be imparted to the user of the instrument, for instance through an optical display device 60.

The receiving device 54 that detects the returning measurement beam 44 has an avalanche photodiode 62, which in the apparatus of the invention is simultaneously used as an element for frequency transposition. If the bias voltage is such a photodiode, which voltage determines the gain of the electrical signal generated, is modulated, then this variation as already noted is also expressed in the electrical output signal of the diode.

If optical measurement radiation at the modulation frequency $f_M$ strikes the active face 52 of the avalanche diode, and if the gain of the diode is modulated by the application of an alternating voltage $u_K(f_M+\Delta f)$, then in the electrical output signal of the diode, not only the total frequency of these two signals but also the differential frequency $\Delta f$ of the two modulation frequencies will be found. This fact known per se is utilized to transform the optical, high-frequency-modulated measurement signal into the range of low frequency (the range up to a few kHz), so that for further evaluation, only low-frequency, easily manipulated signals have to be processed. In the apparatus of the invention, the avalanche photodiode is operated as a mixer element in such a way that besides a high-frequency modulation of the cathode side ($U_K=U_0+u_K(t)$), the anode side of the diode is also modulated ($U_A=u_A(t)$).

To that end, in the apparatus of the invention, for instance by the method disclosed in German Patent DE 198 11 550 C2, a frequency ($f_M+\Delta f$) that is quite close to the optical modulation frequency $f_M$ is generated. This frequency ($f_M+\Delta f$) is modulated upward on the cathode side in a modulator 64 of the supply voltage (bias voltage) $U_0$ of the diode. While in known instruments only the cathode voltage $U_K$ of the diode is modulated, in the apparatus of the invention the anode voltage $U_A$ of the diode is also modulated, with the inverted signal $u_A(t)=-u_K(t)$ of the modulated small-signal voltage of the cathode side. Via suitable connecting lines 65, the modulator 64 furnishes not only the modulated cathode voltage $u_K(t)$ but also the anode voltage $U_A=u_A(t)$ for the diode. These two voltages should as much as possible be of opposite polarity and have the same amplitude.

Figure 2:
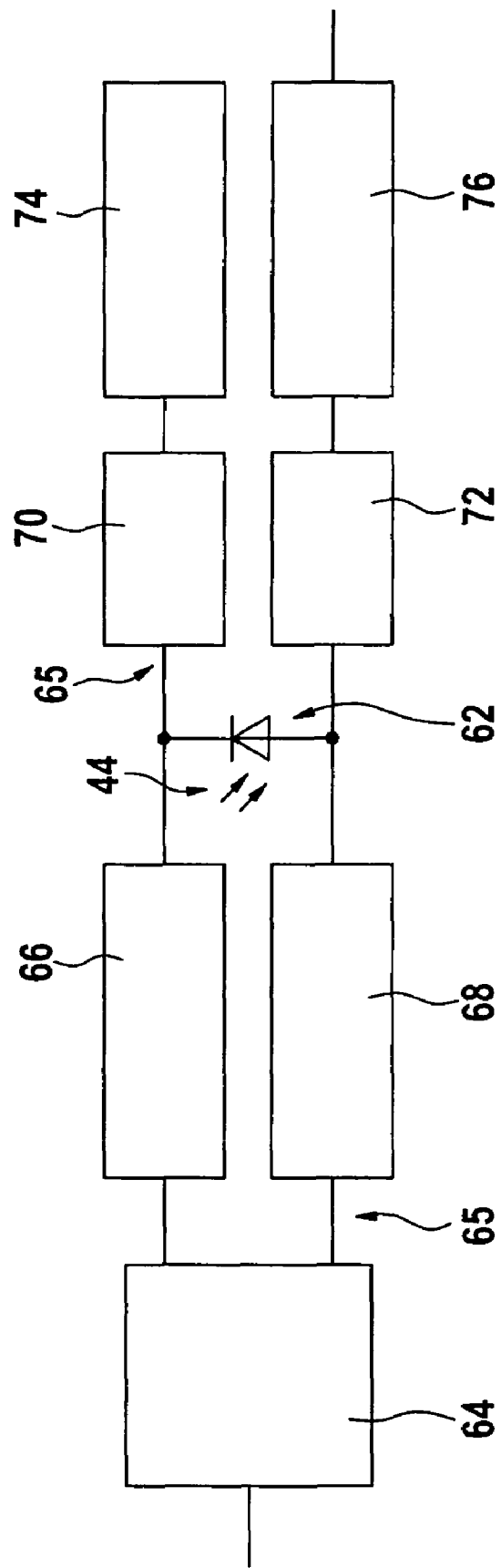
FIG. 2: A circuit arrangement for operating a measurement receiver of the apparatus of the invention for optical distance measurement.

FIG. 2 shows a schematic circuit arrangement for modulation according to the invention of the measurement receiver of a distance measuring device. The avalanche photodiode 62 of the receiving device 54 is struck by the measurement beam 44, reflected or scattered by the target object, which is transformed by the diode into an electrical signal. According to the invention, the avalanche photodiode is modulated on the cathode side with a modulation voltage $u_K=u_K(t)$, while at the same time the anode side of the photodiode is modulated with what in terms of amount is a modulation voltage that is as much as possible the same but is inverted in its polarity, $u_A=u_A(t)=-u_K(t)$. Between the modulator 64 that furnishes both the modulating cathode voltage $u_K(t)$ and the anode voltage $u_A(t)$, and the photodiode 62, there is a respective adaptation network 66 and 68, each, in the exemplary embodiment of FIG. 2. These adaptation networks 66 and 68 are optional and may possibly be necessary in order to attain acceptable amplitudes for the modulation voltages $u_K$ and $u_A$, respectively, in the range of the requisite high frequencies, or to compensate for parasitic interference effects on the modulation voltages.

Advantageously, the modulator 64 furnishes both modulation voltages. To that end, two signals of the same kind of amount can be generated with a phase displacement of 180° and fed to the corresponding electrodes of the diode.

On the output signal side of the photodiode 62 of the invention, there are low-pass filters 70 and 72 in the receiving device 54. The low-pass filters 70 and 72 block the high-frequency portions of the signal, and in particular the high-frequency modulation frequency for the gain of the diode as well as the electrical output signal of the diode, corresponding to the optical signal, and thus make it possible for only the low-frequency mixed signal to be delivered for further evaluation. In the process, the low-pass filters 70 and 72 should have the smallest possible impedance courses for the operating frequency. In a very simple exemplary embodiment, these low-pass filters can be embodied by a resistor and a capacitor.

The receiving device 54 of the invention furthermore has a direct current voltage source 74, which is used as a DC blocking voltage source for fixing or regulating the operating point of the photodiode. The DC blocking voltage source furnishes the voltage difference $U_0$, applied via the diode, with which the photodiode is biased in the blocking direction. Superimposed on this DC signal on both the cathode and the anode sides are the modulated small-signal voltages $u_K(t)$ and $u_A(t)$, respectively.

The low-frequency mixed signal (the mixed product of an electrical modulation frequency at the electrodes of the photodiode and the frequency of the modulation of the optical measurement signal) is delivered to an amplifier element 76, which amplifies the mixed signal, which carries the phase information, in a desired way prior to further evaluation. The individual components of the apparatus are connected to one another in a suitable way via electrical connecting lines (65).

The amplitude of the mixed signal before amplification is determined essentially by the amplitude of the incident optical signal and by the gain in the photodiode. For the mixing in the diode, it is essentially the time-dependent differential signal $U_D(t)$ between the cathode voltage $U_K$ and the anode voltage $U_A$ that is responsible. The mixed signal of the diode, which is proportional to $U_D(t)$ for the apparatus according to the invention accordingly becomes:

$$U_D(t)=U_A(t)-U_K(t)=u_A(t)-u_K(t)=2u_A(t)=-2u_K(t).$$

With the modulation according to the invention on both the cathode and anode side of the frequency-mixing avalanche diode, accordingly only half the modulation amplitude is needed, compared to pure cathode modulation. This is advantageous particularly in the range of relatively high and extremely high measurement frequencies of the optical signal. Since the modulation frequency of the gain of the photodiode should be as close as possible to the (high) modulation frequency of the optical measurement signal, such a system requires correspondingly high power for the electronic frequency drivers. With the apparatus of the invention, because of the reduced demands in terms of the necessary modulation amplitude, it is therefore possible to lower the driver power accordingly as well.

Furthermore, the reradiation of the detection system, which is a loss mechanism, is also reduced to one-quarter of the value that is established in conventional modulation on only the cathode side. The receiving device, which with adequate precision acts as an electrical short antenna, has a reradiation which increases quadratically with the amplitude of modulation, so that halving the modulation amplitude makes a marked reduction in the reradiation possible.

Common-mode interference, which occurs in the same way in both the anode and the cathode paths, is no longer mixed in as well in the method of the invention and thus cannot cause any adulteration of measured values. For this purpose it is necessary that the modulating cathode voltage $u_K(t)$ and the anode voltage $u_A(t)$ have as much as possible exactly the opposite polarity and the same amplitudes. The better this condition is met, the better the circuit functions, and the more cleanly can common-mode interference in the measuring system be eliminated.

With the method of the invention and the apparatus of the invention for performing this method, it is possible to assure the mixing efficiency, in the frequency transformation in the low-frequency range, at higher modulation frequencies as well. Thus it becomes possible to use higher modulation frequencies for the optical measurement signal and accordingly to attain greater measurement precision for a distance measuring device. Moreover, the method of the invention makes it possible to reduce the interfering radiation emitted by the associated measuring device and to achieve better suppression of interference factors to the receiving unit of the measuring device.

Neither the method of the invention and the apparatus of the invention for performing this method are limited to the described exemplary embodiment shown in the drawings.

The invention claimed is:

1. A method for optical distance measurement, in which at least one transmission unit of a transmission branch (14) of a measuring device (10) transmits modulated measurement beam (16, 36) in the direction of a target object (20), and the measurement beam (17, 44) returning from the target object (20) is detected in the measuring device (10) by at least one measuring diode (62), present in a reception branch (18) of the device (10), and delivered to a control and evaluation unit (58) of the measuring device, and the at least one measuring diode (62) of the reception branch (18) is also used as a frequency-mixing component for transformation of a measurement signal to be evaluated, characterized in that besides the cathode voltage $U_K(U_K=U_0+u_K(t))$ of the measuring diode (62), an anode voltage $U_A$ of the measuring diode (62) is also modulated ($U_A=u_A(t)$).

2. The method for optical distance measurement of claim 1, characterized in that the anode voltage $U_A$ is modulated ($U_A=u_A(t)=-u_K(t)$) with the inverted, modulated cathode voltage ($-u_K(t)$).

3. The method for optical distance measurement of claim 1 or 2, characterized in that the modulated cathode voltage $u_K(t)$ and the modulated anode voltage $u_A(t)$ is generated by a common modulator (64).

4. An apparatus for optical distance measurement having at least one transmitter (14) with at least one transmitter (22, 24) for transmitting modulated measurement beam (16, 36) in the direction of a target object (20), and having at least one reception branch (18) with at least one measurement receiver for receiving the measurement beam (17, 44) returning from the target object (20), and the measurement receiver (54) is provided with a photodiode (62) acting as a frequency mixer element, and having a control and evaluation unit (58) for ascertaining the distance from the apparatus (10) to the target object (20), characterized in that a diode bias voltage applied to the diode (62) is modulated on both the cathode and anode sides.

5. The apparatus of claim 4, characterized in that the anode voltage $u_A(t)$ that modulates the anode side is essentially equal to the inverted cathode voltage $u_K(t)$ ($u_A(t)=-u_K(t)$) modulated on the cathode side of the diode.

6. The apparatus of claim 4 or 5, characterized in that the apparatus has the modulator (64), with the aid of which both the modulated cathode voltage $u_K$ and the modulated anode voltage $u_A$ can be generated.

7. The apparatus of claim 6, characterized in that electrical connecting means (65) which have at least one adaptation network (66, 68) are provided between the modulator (64) for generating the modulated cathode voltage and anode voltage and the diode (62) used as a mixer element.

8. The apparatus of one of claims 4 through 7, characterized in that the photodiode (62) is an avalanche photodiode.

* * * * *